UNITED STATES PATENT OFFICE.

GEORGE BLARDONE, OF NEW ORLEANS, LOUISIANA, ASSIGNOR OF ONE-HALF TO JOSEPH M. FORNARIS AND CO., OF NEW ORLEANS, LOUISIANA, A CORPORATION.

PROCESS FOR THE EXTRACTION OF SILICA FROM RICE-HULLS, &c.

1,293,008.     Specification of Letters Patent.     Patented Feb. 4, 1919.

No Drawing.     Application filed September 13, 1917. Serial No. 191,241.

*To all whom it may concern:*

Be it known that I, GEORGE BLARDONE, a citizen of the United States, residing at New Orleans, in the parish of Orleans and State of Louisiana, have invented certain new and useful Improvements in Processes for the Extraction of Silica from Rice-Hulls, &c., of which the following is a specification.

This invention is a process for the extraction of silica in the form of alkali metal silicates from the hulls of a grain such, for example, as rice, whether in a normal or in a green state, or in a burned condition.

Rice hulls constitute a waste product from rice mills and this waste has heretofore been considered of little value. The hulls, however, contain in their natural state about twenty per cent. of silica on a moisture free basis and the ash resulting from their burning contains at times as much as ninety-five per cent. of silica depending upon the temperature to which the hulls are subjected and the amount of oxygen supplied during the burning process. The present invention, therefore, has as its object to provide for the extraction of the silica from this waste product by treatment of the hulls either in their original condition or after having been burned, to produce an alkali metal silicate or silicates.

In carrying out the process the rice hulls whether burned or in their original condition are treated preferably with the carbonates or hydroxids of an alkali metal as, for example, sodium or potassium, although certain other salts of the alkali metals may be employed. As a specific example of the carrying out of the process, four or five parts by weight of burned rice hulls, ten parts of water and one part of sodium hydroxid are boiled together for a period of one-half to several hours after which the mixture is filtered, the mass remaining in the filter being washed with water and the filtrate being concentrated to the desired degree by boiling. In this manner the silica is extracted from the rice hulls as a concentrated solution of sodium silicate known commercially as water glass. The proportions of the several substances or ingredients may be varied within wide limits as also the length of the period of boiling or heating.

The principles of the process may also be followed by fusing together three or four parts of burned rice hulls and one part of sodium carbonate, or eight or ten parts of burned rice hulls and three parts of sodium sulfate. The fused product is then treated with water whereby to extract the sodium silicate, filtered, and the filtrate evaporated to the required density.

Where fresh, raw, or partially burned rice hulls are used in lieu of burned rice hulls, the proportions should be such as to accord with the silica content of the material.

It will be understood, of course, that the hulls may be treated either in their whole state or prior to treatment may be ground, crushed, or otherwise comminuted. It will be understood, of course, that in carrying out the process the carbonates or hydroxids of several of the alkali metals may be employed in mixture.

Having thus described the invention, what is claimed as new is:

1. That process for the extraction of the silica content of rice hulls or the like which consists in heating the hulls or the like in the presence of a compound of an alkali metal capable of reacting with the silica content to produce a silicate of the alkali metal.

2. That step in the process for the extraction of the silica content of rice hulls or the like which consists in mixing the hulls or the like with a hydroxid of an alkali metal and heating the mixture.

In testimony whereof I affix my signature.

GEORGE BLARDONE. [L. S.]